US008682879B2

(12) United States Patent
Kim et al.

(10) Patent No.: US 8,682,879 B2
(45) Date of Patent: Mar. 25, 2014

(54) MARKER SEARCH SYSTEM FOR AUGMENTED REALITY SERVICE

(75) Inventors: Jae-Hyung Kim, Seoul (KR);
Jong-Cheol Hong, Seoul (KR);
Hong-Geun Kim, Goyang-si (KR);
Bong-Ki Kwon, Anyang-si (KR)

(73) Assignee: Bizmodeline Co., Ltd., Seoul (KR)

( * ) Notice: Subject to any disclaimer, the term of this patent is extended or adjusted under 35 U.S.C. 154(b) by 391 days.

(21) Appl. No.: 12/762,224

(22) Filed: Apr. 16, 2010

(65) Prior Publication Data
US 2011/0258175 A1 Oct. 20, 2011

(51) Int. Cl.
*G06F 17/30* (2006.01)
(52) U.S. Cl.
USPC ...... 707/706; 707/741; 345/633; 235/462.01; 235/462.1; 235/494
(58) Field of Classification Search
None
See application file for complete search history.

(56) References Cited

U.S. PATENT DOCUMENTS

| | | | | |
|---|---|---|---|---|
| 5,886,698 | A * | 3/1999 | Sciammarella et al. | 715/769 |
| 6,917,370 | B2 * | 7/2005 | Benton | 345/633 |
| 2003/0078766 | A1 * | 4/2003 | Appelt et al. | 704/9 |
| 2003/0121006 | A1 * | 6/2003 | Tabata et al. | 715/513 |
| 2003/0126117 | A1 * | 7/2003 | Megiddo et al. | 707/3 |
| 2005/0264555 | A1 | 12/2005 | Zhou et al. | |
| 2005/0274810 | A1 * | 12/2005 | Schmidt et al. | 235/462.43 |
| 2005/0289590 | A1 * | 12/2005 | Cheok et al. | 725/37 |
| 2007/0035562 | A1 * | 2/2007 | Azuma et al. | 345/633 |
| 2007/0214155 | A1 * | 9/2007 | Chang et al. | 707/100 |
| 2007/0239724 | A1 * | 10/2007 | Ramer et al. | 707/10 |
| 2008/0017722 | A1 * | 1/2008 | Snyder et al. | 235/494 |
| 2008/0048044 | A1 * | 2/2008 | Zhao et al. | 235/494 |
| 2008/0071559 | A1 * | 3/2008 | Arrasvuori | 705/1 |
| 2008/0203167 | A1 * | 8/2008 | Soule et al. | 235/462.01 |
| 2009/0069000 | A1 * | 3/2009 | Kindberg et al. | 455/414.3 |
| 2009/0285444 | A1 * | 11/2009 | Erol et al. | 382/100 |
| 2009/0289956 | A1 * | 11/2009 | Douris et al. | 345/633 |
| 2010/0045869 | A1 | 2/2010 | Baseley et al. | |
| 2010/0048290 | A1 * | 2/2010 | Baseley et al. | 463/25 |

FOREIGN PATENT DOCUMENTS

| | | |
|---|---|---|
| JP | 2003-345807 A | 12/2003 |
| JP | 2005-250950 A | 9/2005 |
| JP | 2007-133896 A | 5/2007 |
| JP | 2008-028583 A | 2/2008 |
| JP | 2010-049690 A | 3/2010 |
| JP | 2011-204047 A | 10/2011 |
| WO | 2005/116807 A1 | 12/2005 |

OTHER PUBLICATIONS

"CyberCode: Designing Augmented Reality Environments with Visual Tags," by Rekimoto & Ayatsuka. In: DARE 2000 (Apr. 2000). Available at: ACM.*

(Continued)

*Primary Examiner* — Daniel Kinsaul
(74) *Attorney, Agent, or Firm* — Maschoff Brennan

(57) ABSTRACT

A search system, a user device, and a server for AR service are disclosed. The search system includes a search engine configured to search a web content and a marker, in response to an input of a user, a matching unit configured to match the searched web content with the searched marker, and an output unit configured to transmit a document including the searched web content and the searched marker to the user.

16 Claims, 8 Drawing Sheets

(56) References Cited

OTHER PUBLICATIONS

"2D Barcode and Augmented Reality Supported English Learning System," by Liu et al. In: 6th IEEE/ACIS Int'l Conf. on Computer and Information Science (2007). Availablet at: IEEE.*

"QR Code and Augmented Reality-Supported Mobile English Learning System," by Liu et al. In: WMMP (2008). Available at: SpringerLink.*

"Marker Tracking and HMD Calibration for a Video-based Augmented Reality Conferencing System," by Kato & Billinghurst. In: Proc. 2nd IEEE & ACM INt'l Workshop on Augmented Reality (1999).*

"UMAR: Ubiquitous Mobile Augmented Reality," by Henrysson & Ollila. In: Proc. 3rd Int'l Conf. on Mobile and Ubiquitous Multimedia (2004). Available at: IEEE.*

"Applying QR Code in Augmented Reality Applications," by Kan et al. In: Proc. 8th INt'l Conf. on Virtual Reality Continuum and its Applications in INdustry (2009). Available at ACM.*

International Preliminary Report on Patentability dated Apr. 5, 2011 as received in related PCT Application No. PCT/KR1020/008986.

"QR Code," Last Modified on Apr. 27, 2012, Accessed at http://en.wikipedia.org/wiki/QR_Code, pp. 11.

"Barcode Contents," Last updated on Feb. 16, 2012, Accessed at http://code.google.com/p/zxing/wiki/BarcodeContents, pp. 4.

* cited by examiner

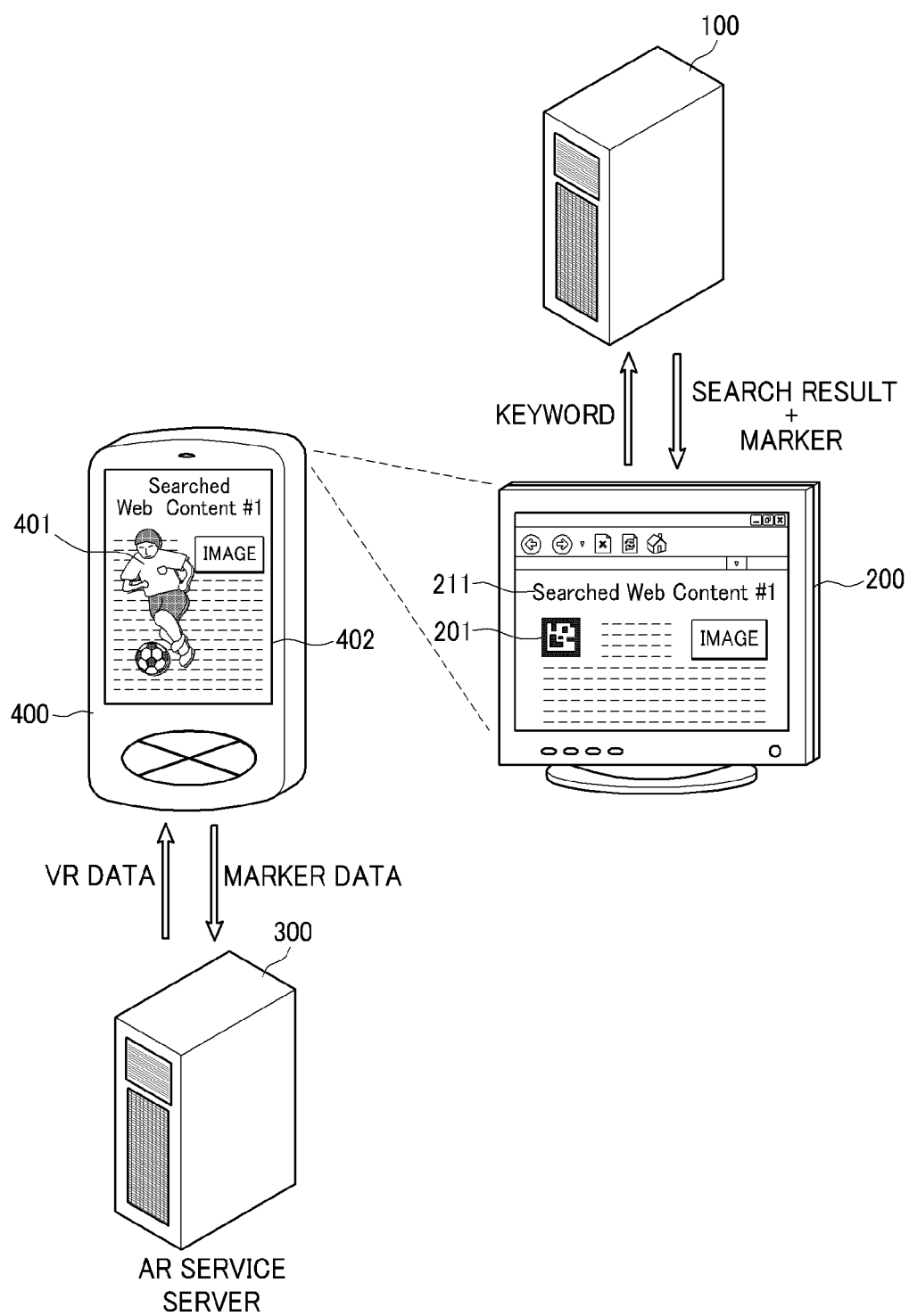

MARKER SEARCH SYSTEM FOR AUGMENTED REALITY SERVICE

BACKGROUND

An augmented reality (AR) technology creates a newly mixed reality by merging elements of a real-world environment with virtual reality data. In implementing AR applications in various fields, such as entertainment, TVs, games, education, music or movies, a marker can be used. The marker is a two-dimensional image identifying virtual reality data information, and uses random pattern in general. As images and video files for AR applications are standardized to a certain format (for example, JPG or MPEG), an interest has been increased for a standardized marker format.

SUMMARY

Various embodiments of marker search system for augmented reality service are disclosed herein. In one embodiment, a system includes a search engine configured to search a web content and a marker, in response to an input of a user, a matching unit configured to match the searched web content with the searched marker, and an output unit configured to transmit a document including the searched web content and the searched marker to the user.

In another embodiment, an augmented reality (AR) service server is provided. The AR service server is in communications with an AR user device. The AR service server includes a marker data receiver configured to receive marker data from an AR user device, a virtual reality (VR) data database configured to store VR data, a VR data retriever configured to receive the marker data from the marker data receiver and to access the VR data database to search for VR data corresponding to the received marker data, and a VR data transmitter configured to transmit the searched VR data to the AR user device.

In still another embodiment, an augmented reality (AR) user device is provided. The AR user device is in communications with AR service server and includes a marker sensor configured to sense and extract a marker from a real-world image captured by a camera, a marker data transmitter configured to transmit marker data of the marker to the AR service server, a virtual reality (VR) data receiver configured to receive a VR data corresponding to the marker data from the AR service server, and an AR data generator configured to generate an AR data by using the received VR data and the real-world image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1B shows a schematic diagram showing an environment in which an illustrative embodiment of an AR service is implemented.

DETAILED DESCRIPTION

Figure 1A:
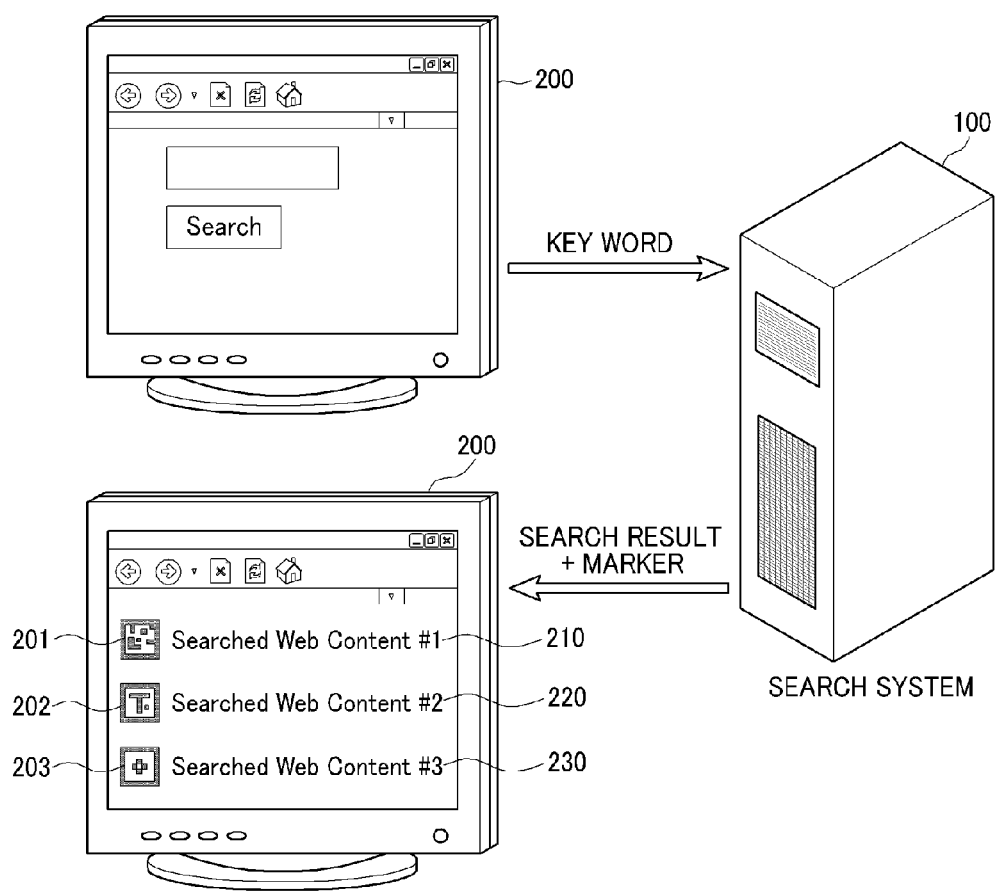
FIG. 1A shows a schematic diagram showing an environment in which an illustrative embodiment of a search system is implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1A shows a schematic diagram showing an environment in which an illustrative embodiment of a search system is implemented. FIG. 1A illustrates a search system 100 in communications with one or more client systems 200. Search system 100 searches for a web content and a corresponding marker, in response to a keyword received from client system 200, and prepares a document containing the web content and the marker, which will be described in detail hereinafter with reference to FIG. 2. The term "marker" as used herein refers to a two-dimensional image identifying virtual reality (VR) data used to provide AR service. Client system 200 is an apparatus through which a user accesses search system 100. Client system 200 can include an input unit, a display unit, and a communication unit. By way of examples, a PC, a PDA (personal digital device), a mobile phone, a smart phone or a kiosk can be implemented as client system 200, without limitation.

In some embodiments, search system 100 can be wirelessly interacted with client system 200, and provide client system 200 with a search interface, such as general search portal sites (for example, Google™ and Yahoo™), through a web browser (for example, MS Explorer™). For example, if a user inputs into client system 200 a keyword, client system 200 transmits the keyword to search system 100.

Search system 100 searches for web contents (for example, documents, news, blogs, images, videos, and the like) in response to the keyword received from client system 200 and markers corresponding to the web contents. In one embodiment, search system 100 can search on web browsers or its databases to find out the web contents and corresponding markers in response to the keyword, which will be discussed hereinafter. Then, search system 100 transmits a document having the searched web contents and their corresponding markers to client system 200. For example, the document may have a list of hyperlinks (for example, 210, 220 and 230) referring to the searched web contents and corresponding markers (for example, 201, 202 and 203), as illustrated in FIG. 1A. By way of example, if a user inputs a keyword "soccer" in client system 200, client system 200 can transmit to search system 100 a search request having the keyword "soccer". In response to the search request, search system 100 can search for the web contents and markers corresponding to the keyword "soccer", and transmit to client system 200 the search results. Client system 200 can list on its screen the hyperlinks referring to the searched web contents and corresponding markers which are retrieved through a web browser. A configuration of search system 100 searching the web contents and corresponding markers as described above will be described hereinafter in detail with reference to FIG. 2.

FIG. 1B shows a schematic diagram showing an environment in which an illustrative embodiment of an AR service is implemented. FIG. 1B illustrates that an AR user device 400 provides AR service by using a virtual reality (VR) data received from an AR service server 300 and the searched web contents and corresponding marker displayed on client system 200.

AR user device 400 captures a real-world image and extracts a marker from the real world image. Further, AR user device 400 transmits the extracted marker to AR service server 300 and receives VR data in response to the marker from AR service server 300. Accordingly, AR user device 400 provides a user with AR service by overlaying the VR data on the real world image. In one embodiment, AR user device 400 may include a camera to capture a real-world image, a marker sensor to sense and extract a marker from the real-world image, a communication unit for wireless communications with AR service server 300, such as a marker data transmitter and a VR data receiver, an AR data generator to generate AR data by combining VR data and the real-world image, and a display unit to display augmented reality on its screen. A configuration of AR user device 400 will be described in detail hereinafter, with reference to FIG. 4. Although FIG. 1B illustrates a mobile phone as one example of AR user device 400, it is apparent to those skilled in the art that AR user device 400 can be implemented as any type of device. For example, AR user device 400 may be implemented as a smart phone, a PDA, a UMPC (ultra mobile PC), a head-mounted display (HMD) or the like.

AR service server 300 searches for VR data in response to the marker transmitted from AR user device 400, and transmits the searched VR data to AR user device 400. A configuration of AR service server 300 will be described in detail hereinafter, with reference to FIG. 4.

In one embodiment, AR user device 400 may capture a screen image of client system 200 by using the camera of AR user device 400. The screen image of client system 200 may show web contents and corresponding markers searched by search system 100 in response to a user's keyword. Particularly, client system 200 may transmit to search system 100 a search request containing the user's keyword, and client system 200 may display the web contents and corresponding markers searched by and transmitted from search system 100, as described above with reference to FIG. 1A. Since the searched web contents and corresponding markers may be displayed on a screen of client system 200 as hyperlinks, a user can select one of the hyperlinks, and, then, client system 200 can display on its screen the selected web content (for example, 211) retrieved through a web page with the corresponding marker (for example, 201). As one illustrative example, FIG. 1B shows that AR user device 400 captures the screen image of client system 200 and displays on its screen 402 a playing soccer image as VR data 401 corresponding to marker 201.

AR user device 400 may further sense and extract the marker (for example, 201) from the captured screen image (for example, 401), and transmit data of extracted marker 201 to AR service server 300. A method for extracting the marker from the captured imaged will be described in detail hereinafter with reference to FIG. 4. AR service server 300 may search for VR data 401 corresponding to received marker 201 from a VR data database and transmit searched VR data 401 to AR user device 400. AR user device 400 may overlay VR data 401 on the captured screen image to create an AR image. By way of example, if the user selects "Beckam," soccer player, as a web content, the selected web content and a corresponding marker can be displayed on client system 200. Then, AR user device 400 can capture the web content and the marker and transmit the marker to AR service server 300. In response to the transmitted marker, AR service server 300 can search and transmit VR data (for example, "Beckman"'s image, video or 3D-object) to AR user device 400. Thus, AR user device 400 can overlay the transmitted VR data (for example, Beckman's image) on the captured web content image which has been displayed on screen 402.

VR data 401 can contain variety of information (for example, video or 3D-object), as well as an image. Thus, AR service can be created by combining VR data 401 and a real-world image. In addition, the AR service can interactively provide variety of information in response to a user's request. For example, VR data 401 can further provide a rotated image, video or 3D-object in response to a request inputted by the user.

Figure 2:
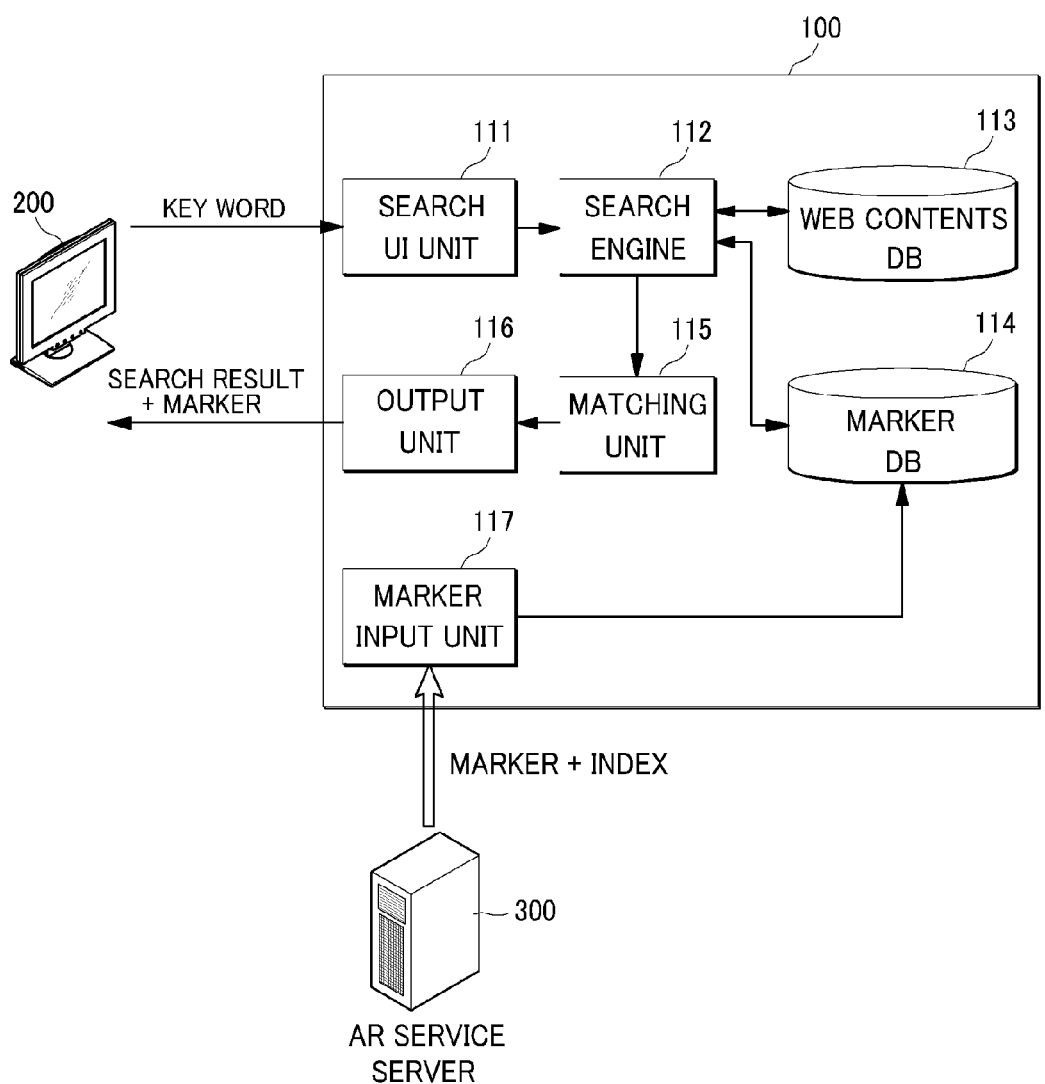
FIG. 2 shows a block diagram of an illustrative embodiment of the search system shown in FIG. 1A.

FIG. 2 shows a block diagram of an illustrative embodiment of the search system shown in FIG. 1A. In one embodiment, search system 100 may include a search user interface (UI) unit 111, a search engine 112, a web contents database (DB) 113, a marker DB 114, a matching unit 115, an output unit 116, and a marker input unit 117. In another embodiment, one or more of, web contents DB 113, marker DB 114, and marker input unit 117 may be optionally omitted. For example, one or more of web contents DB 113, marker DB 114, and marker input unit 117 may be implemented in an external device and their operations may be remotely performed.

Search UI unit 111 receives from client system 200 a search request containing a keyword which is inputted by a user.

Search engine 112 receives the search request containing the keyword from search UI unit 111 and accesses web contents DB 113 and marker DB 114 to search for a web content and a marker corresponding to the keyword. In one embodiment, one or more of web contents DB 113 and marker DB 114 may be implemented in an external server. In this case, search engine 112 can access the external server by using an address of the external server through a network such as, Internet, intranet, value added network, or public switched data network. Search engine 112 can be implemented by means of various types of search engine software. For example, search engine 112 can be implemented by search engine software capable of searching for web contents including, but not limited to, words, subjects, indexes, and categories and markers, in response to a search keyword.

Web contents DB 113 stores therein web contents and provides search engine 112 with the web contents, or addresses of such web contents, in response to the search request of search engine 112. Marker DB 114 stores therein markers and indexes thereof, and provides search engine 112 with the markers and indexes, in response to the search request of search engine 112. As used herein, the term "index" of the marker refers to one or more terms describing VR data of the marker. An illustrative example of the index will be described later in detail with reference to FIG. 3. In one embodiment, search engine 112 may search the marker corresponding to the keyword by calculating a similarity between the keyword and the indexes of the each marker.

Matching unit 115 receives the searched web content from search engine 112, and matches the searched web content with the marker, based on a lookup table. The table shows a correlation between the web contents and the markers searched through web contents DB 113 and marker DB 114. In one embodiment, matching unit 115 may match the searched web content with the searched marker by using a correlation value for the keyword inputted by the user. Here, the term "correlation value" for the keyword refers to a value calculated by correlating binary codes of the keyword with binary codes of the index of the marker (or with binary codes of texts in the web content). As the correlation value for the keyword increases, the similarity between the keyword and the marker (or the web content) increases. By way of example, matching unit 115 may sort the searched web contents and the searched markers in a descending order, respectively, based on correlation values for the keyword, and then, match each of the searched web contents with each of the searched markers in sequence. Matching unit 115 creates a document containing the matched web content and marker by using a predetermined template. By way of examples, there is a hypertext mark-up language document. One skilled in the art will create the document by using various mark-up languages, for example, hypertext markup language (HTML), standard generalized markup language (SGML), extensible markup language (XML), or the like.

Output unit 116 receives from matching unit 115 the document containing the searched web content and marker, and transmits the document to client system 200. If a multiple number of web contents and markers have been searched, output unit 116 may generate a list of the documents containing the searched web contents and markers and transmit the list to client system 200.

Marker input unit 117 receives a marker and an index from an outside, for example, AR service server 300, and transmits the received marker and index to marker DB 114. In one embodiment, marker input unit 117 may check whether the input of the marker and index is authorized. For example, marker input unit 117 may request a user or an external device to input a user's ID or a password prior to the input of the marker and the index, and, then, allow an authorized user or external device to input a marker and an index into marker input unit 117. Marker input unit 117 may provide the user or the external device with a web page containing a user interface through which the user or the external device can input a marker and its index. As described above, in some embodiments, marker input unit 117 may be implemented in an external server, and, then, receive from a user markers and indexes for transmitting to marker DB 114.

As described above, search system 100 may provide a web content and a marker together, in response to a keyword contained in a search request. Further, in some embodiments, search system 100 may continuously receive and store markers from an outside through, for example, marker input unit 117, and, thus, use the collected markers for further marker searches.

Figure 3:
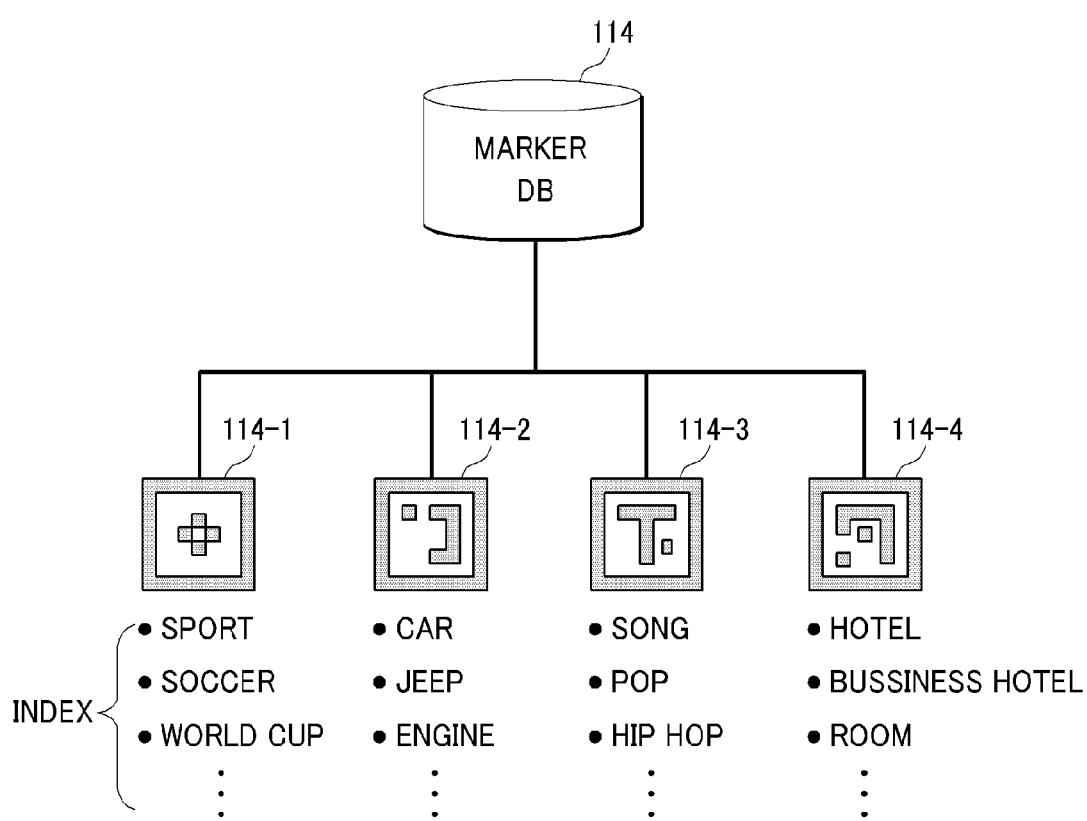
FIG. 3 is a schematic diagram of an illustrative embodiment of a marker stored in the marker DB shown in FIG. 2.

FIG. 3 is a schematic diagram of an illustrative embodiment of the marker stored in the marker DB shown in FIG. 2. Marker DB 114 stores therein markers (114-1, 114-2, 114-3 and 114-4) and their corresponding indexes. As described above, the term "index" of the marker refers to one or more terms describing VR data of the marker. Further, the indexes may include superordinate terms or subordinate terms that describe the VR data. Such superordinate or subordinate terms may be listed in a descending order (from high concept to low concept) or an ascending order (from low concept to high concept). For example, as for a term "SPORTS," its subordinate terms are "SOCCER", "World Cup", etc. Here, a term "World Cup" subordinates to the term "SOCCER". In a similar way, indexes, such as "CAR," "JEEP," or "ENGINE", may be stored in sequence. Search engine 112 can search for a marker which is related to a keyword inputted by a user by using the indexes of the markers stored in marker DB 114.

Figure 4:
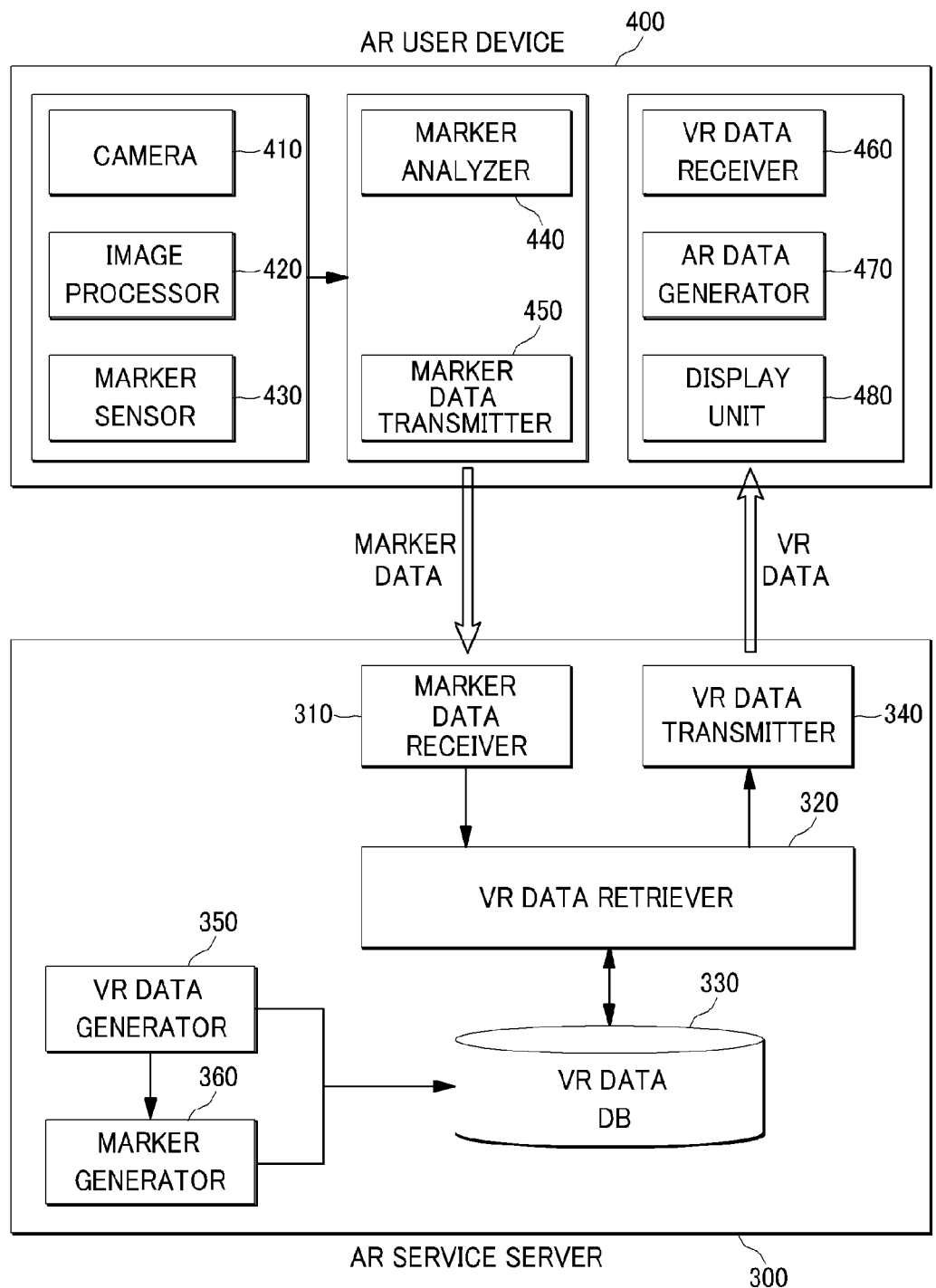
FIG. 4 is a schematic diagram of an illustrative embodiment of the AR user device and the AR service server shown in FIG. 1B.

FIG. 4 is a schematic diagram of an illustrative embodiment of the AR user device and the AR service server shown in FIG. 1B. In one embodiment, AR user device 400 may include a camera 410, an image processor 420, a marker sensor 430, a marker analyzer 440, a marker data transmitter 450, a VR data receiver 460, an AR data generator 470, and a display unit 480. In another embodiment, one or more of, camera 410, image processor 420, marker analyzer 440 and display unit 480 may be optionally omitted. For example, one or more of, camera 410, image processor 420, marker analyzer 440 and display unit 480 may be implemented in an external device and their operations may be remotely performed.

Camera 410 captures a real-world image containing a marker. Although FIG. 4 illustrates AR user device 400 includes camera 410, it is apparent to those skilled in the art that camera 410 may be installed in an external device operably coupled with AR user device 400.

Image processor 420 converts the real-world image captured by camera 410 into digital image data, for example, file format jpeg, tiff, gif, bmp or the like. In one embodiment, image processor 420 may convert accumulated multiple digital image data into video data, for example, file format avi, fly, mpeg, wmv or the like. In another embodiment, image processor 420 may be installed together with camera 410 in the external device.

Marker sensor 430 receives the digital image from image processor 420 and senses and extracts the marker from the digital image data. By way of example, if the marker has an image of a specific pattern, such as a black square barcode, marker sensor 430 may sense the marker by detecting corners and pixels of the marker from the digital image and extract the marker. For example, an algorithm for detecting continuous black pixels and a corner detection algorithm, such as Harris corner detection algorithm, can be used in sensing and extracting a black square barcode type marker.

Marker analyzer 440 receives the extracted marker from marker sensor 430, analyzes the extracted marker and generates marker data. Here, the "marker data" refers to data including at least one of the marker itself and marker metadata. In one embodiment, marker analyzer 440 may generate the marker metadata as a result of analyzing of the marker. As used herein, the term "marker metadata" refers to abstract data describing properties (for example, a marker identifier (ID), an AR service server address, a category, a version, a search system address or the like) of the marker. A configuration of the marker metadata will be explained hereinafter in detail with reference to FIG. 6. In another embodiment, the marker data may be the marker itself. In this case, marker analyzer 440 may be optionally omitted and the marker itself can be used as the marker data.

Marker data transmitter 450 receives the generated marker data from marker analyzer 440 and transmits the marker data to AR service server 300. If the marker data is the marker itself, marker data transmitter 450 may directly receive the marker data (i.e., the marker itself) from marker sensor 430. As described above, the marker data may be the marker itself or include at least part of the marker metadata. Marker data transmitter 450 transmits the marker data to AR service server 300 through a wired or wireless communication network. If AR user device 400 is a portable device, the marker data may be transmitted through a wireless communication network from marker data transmitter 450 to AR service server 300. In this case, various wireless communication technologies, such as CDMA (code division multiple access), TDMA (time division multiple access), OFDMA (orthogonal frequency division multiple access), 3GPP, 3GPP2, or Mobile Wimax, can be used.

After AR service server 300 receives the marker data from marker data transmitter 450 and searches VR data corresponding to the marker data, it transmits to VR data receiver 460 the VR data corresponding to the marker data, through a wired or wireless communication network. The VR data may include images, videos or 3D-objects, corresponding to the marker data. Particularly, AR service server 300 may store the VR data corresponding to each of the marker data, and search and transmit the VR data in response to the marker data transmitted from marker data transmitter 450 of AR user device 400. In one embodiment, the VR data may be interactively changed in response to the user's request. By way of example, the VR data can be implemented to further provide a rotated image, video or 3D-object in response to a user's request.

AR data generator 470 receives VR data from VR data receiver 460 and generates AR data by overlaying the received VR data on the captured digital image. In one embodiment, AR data generator 470 may generate video data using a multiple number of images and generate AR data by overlaying the VR data on the video data.

Display unit 480 displays the generated AR data. Display unit 480 can provide a user with an image of the searched web content and the VR data, as depicted in FIG. 1B. In one embodiment, display unit 480 may be optionally omitted and implemented in an external device, such as a PC monitor, a television, or a projector. In such case, the external device can be operably coupled with AR data generator 470 through a wired or wireless communication network.

In one embodiment, AR service server 300 may include a marker data receiver 310, a VR data retriever 320, a VR data DB 330, and a VR data transmitter 340. In another embodiment, AR service server 300 may optionally further include a VR data generator 350 and/or a marker generator 360.

Marker data receiver 310 receives a marker data transmitted from AR user device 400 (for example, marker data transmitter 450) through a wireless or wired communication network. As described above, the marker data may be a marker itself or include at least part of marker metadata.

VR data retriever 320 receives the marker data from marker data receiver 310 and searches for VR data corresponding to the received marker data from VR data DB 330. In one embodiment, VR data retriever 320 may use a marker identifier (ID) to search for the VR data corresponding to the marker data. VR data retriever 320 may extract the marker ID from the marker when the marker data is the marker itself. For example, VR data retriever 320 may extract the marker ID by using a lookup table in which the marker and the marker ID are correlated. In this case, VR data retriever 320 may include the lookup table therein. In another embodiment, VR data retriever 320 may obtain the marker ID from a predetermined field of marker metadata when the marker data includes the marker metadata in which the marker ID is recorded. In such case, VR data retriever 320 may search for the VR data using the marker ID obtained from the predetermined field.

VR data transmitter 340 receives the searched VR data from VR data retriever 320 and transmits the searched VR data to AR user device 400 through a wired or wireless communication network. If AR user device 400 is a portable device, the VR data are transmitted through a wireless communication network.

In one embodiment, as described above, AR service server 400 may optionally further include VR data generator 350 and marker generator 360 to provide VR data and corresponding marker to VR data DB 330.

VR data generator 350 generates VR data to be used for the AR service and provides the generated VR data to VR data DB 330. The VR data includes images, videos, 3D-objects, and the like. In one embodiment, VR data generator 350 may generate the VR data using an appropriate authoring tool (for example, Photoshop™, Flash™, 3D-MAX™) depending on properties of the VR data.

Marker generator 360 receives the generated VR data form VR data generator 350 and generates markers corresponding to the generated VR data. Each marker may be identified by a marker ID. In one embodiment, a user who generates the marker can assign a marker ID to the generated marker. In another embodiment, marker generator 360 can automatically generate a marker ID and assign the generated marker ID to the generated marker. Marker generator 360 transmits the marker having the marker ID corresponding to the VR data to VR data DB 330. Thus, VR data DB 330 may store the VR data and the marker having the marker ID.

As described above, AR user device 400 obtains real-world data including a marker using camera 410 and transmits marker data to AR service server 300 through a communication network. AR service server 300 provides VR data to AR user device 400 in response to the transmitted marker data. The provided VR data are to be used to offer the AR service by AR user device 400.

Figure 5:
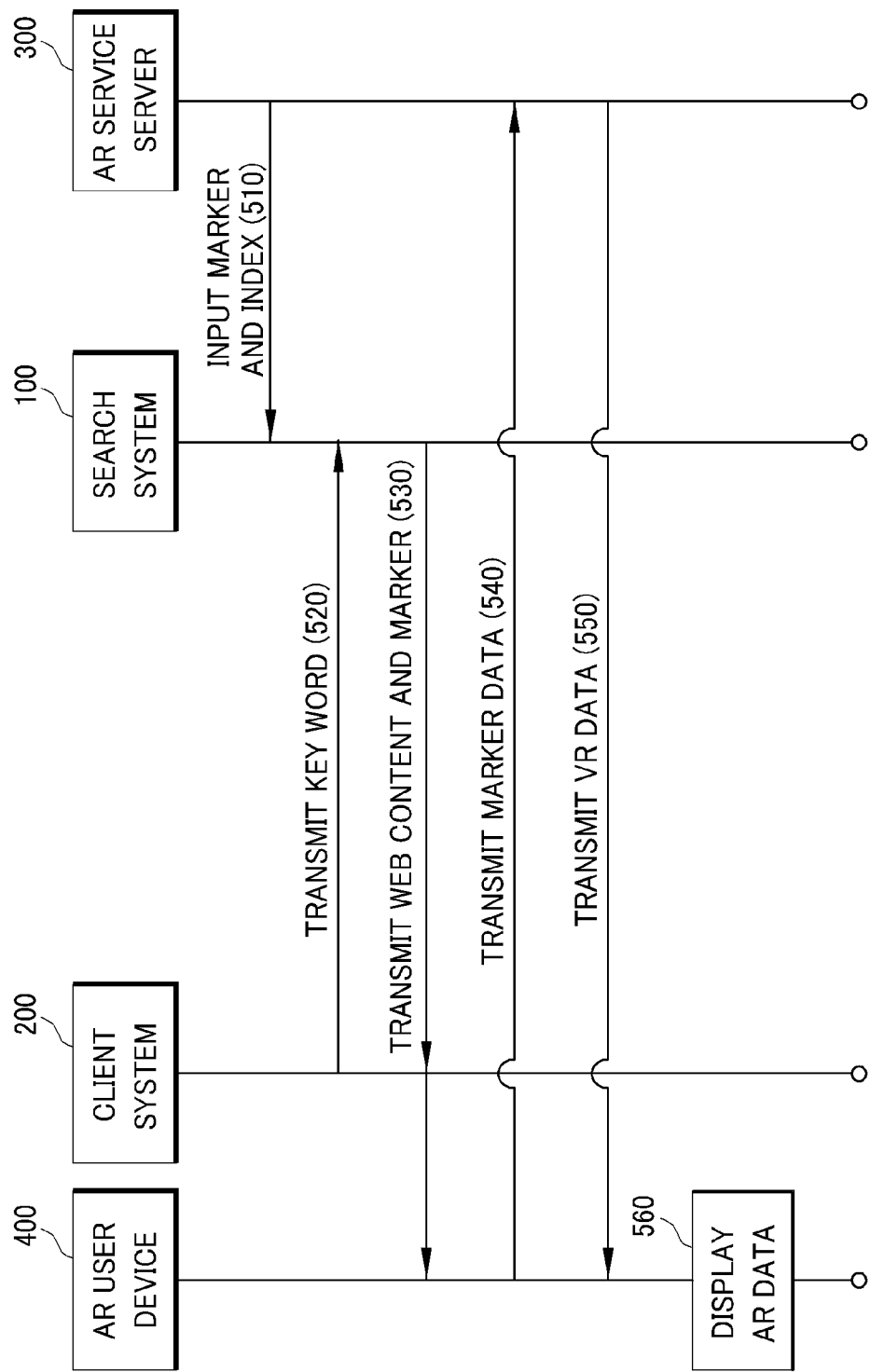
FIG. 5 is a flow diagram of an illustrative embodiment of a method for providing a marker search result.

FIG. 5 is a flow diagram of an illustrative embodiment of a method for providing a marker search result. In an illustrative embodiment, the method may be performed in a network in which search system 100, client system 200, AR service server 300 and AR user device 400 are in wired or wirelessly communications to each other. AR service server 300 may input a marker and its index to search system 100 (510). In this case, AR service server 300 may receive the marker and its index from a user or an external device through marker input unit 117, and, then, store the marker and its index in marker DB 114 (See FIG. 2 and FIG. 3). In another embodiment where marker input unit 117 is implemented in an external device, a user may input the marker and its index to search system 100 by using a web page provided by marker input unit 117.

Client system 200 may transmit a keyword to search system 100 for searching the marker (520). Client system 200 can be implemented as an apparatus including a keyword input unit, a display unit, and a communication unit. By way of examples, a PC, a PDA (personal digital device), a mobile phone, a smart phone or a kiosk, without limitation, can be implemented as client system 200.

Search system 100 that has received the keyword searches for a web content and a marker each corresponding to the keyword, and transmits the searched web contents and markers to client system 200 (530). The transmitted searched web content and markers can be displayed to the user via the display unit of client system 200. Display unit of client system 200 can list on its screen hyperlinks referring to the searched web contents and corresponding markers which are retrieved through a web browser. Thus, the user may select the desired web content from the hyperlinks. In this case, the selected web content is to be displayed together with its corresponding marker.

AR user device 400 can capture a screen image displaying the web content and the marker. As described above, AR user device 400 can capture the image displaying the web content and the marker by using a camera installed on an external device. AR user device 400 senses the marker on the captured image of the displayed web content and generates marker data by analyzing the sensed marker. In one embodiment, the marker data may be a marker image itself. In another embodiment, the marker data may include at least part of marker metadata which can be obtained from the marker. In this case, AR user device 400 (for example, marker analyzer 440) can analyze the marker to obtain the marker metadata from the marker. AR user device 400 can transmit the generated marker data to AR service server 300 through a wired or wireless communication network by using communication unit (540).

AR service server 300 searches for VR data corresponding to the marker data using the transmitted marker data from VR data DB 330 (See FIG. 4). If there is corresponding VR data, AR service server 300 transmits the searched VR data to AR user device 400 through a wired or wireless communication network (550).

AR user device 400 receives the VR data, generates AR data by overlaying the VR data on the captured screen image of client system 200, and displays the AR data (560).

Figure 6:
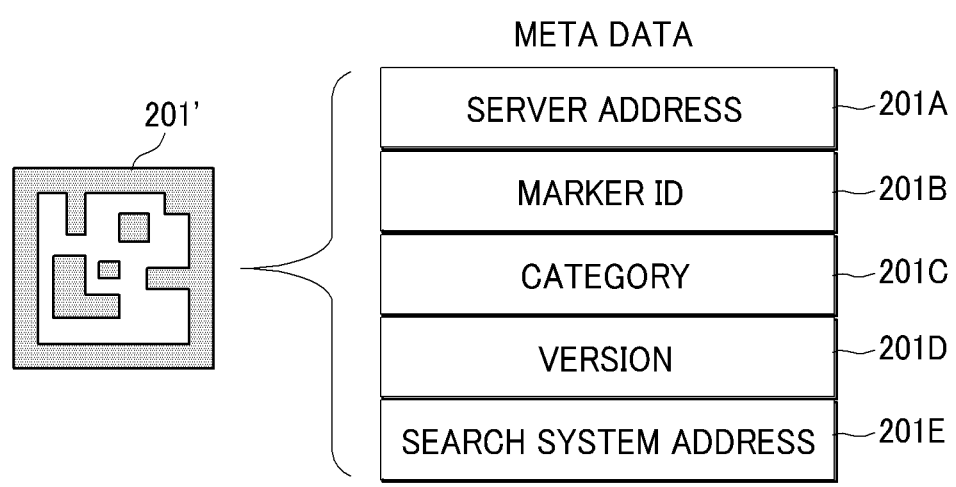
FIG. 6 shows an illustrative embodiment of the marker metadata of the marker shown in FIG. 1B.

FIG. 6 shows an illustrative embodiment of marker metadata of the marker shown in FIG. 1B. As described above, the "marker metadata" refers to abstract data describing properties of the marker. In one embodiment, the marker metadata of marker 201' may include a server address field 201A, a marker ID field 201B, a category field 201C, a version field 201D, and/or a search system address field 201E. The marker metadata can be obtained by marker analyzer 440 of AR user device 400.

Server address field 201A may store therein address information of AR service server 300 to which AR user device 400 transmits marker data. For example, the address information can be an URL (Universal Resource Locator) or an IP address of AR service server 300 to which the marker data is transmitted. AR user device 400 can identify an address of a server which provides VR data by using the address information of AR service server 300. If the address of AR service server 300 is preset, server address field 201A can be omitted.

Marker ID field 201B may store therein an ID assigned to marker 201'. A marker ID may be composed of, but not limited to, a series of numbers, letters or a combination thereof. The marker ID is used to search the VR data corresponding to marker 201' received by AR service server 300. If AR user device 400 transmits marker 201' itself as marker data, marker ID field 201B may be optionally omitted.

Category field 201C may store therein a category which marker 201 belongs to. If AR service server 300 stores therein lots of VR data, information stored in category field 201C can be used to reduce a search range of the VR data. AR service server 300 can efficiently search for the VR data by using the category information stored in category field 201C. If AR service server 300 does not use the category in searching the VR data, category field 201C may be optionally omitted.

Version field 201D may store therein version information of marker 201'. The version information may include a version number, a date on which marker 201' is generated or the like. By way of example, the higher version number may indicate a marker corresponding to more recently developed VR data. AR service server 300 can determine whether or not search system 300 has a marker corresponding to the newest VR data according to the version information in transmitted metadata. If AR service server 300 does not check the version of marker 201', version field 201D may be optionally omitted.

Search system address field 201E may store therein an address of the search system in which marker 201' is stored. Search system address field 201E may store there in a URL (Universal Resource Locator) or an IP address of a search system (for example, search system 100) which has searched for marker 201'. Therefore, AR service server 300 may track which search system has searched the transmitted marker data. If AR service server 300 does not track the search system which has searched the transmitted marker data, search system address field 201E may be optionally omitted.

Figure 7:
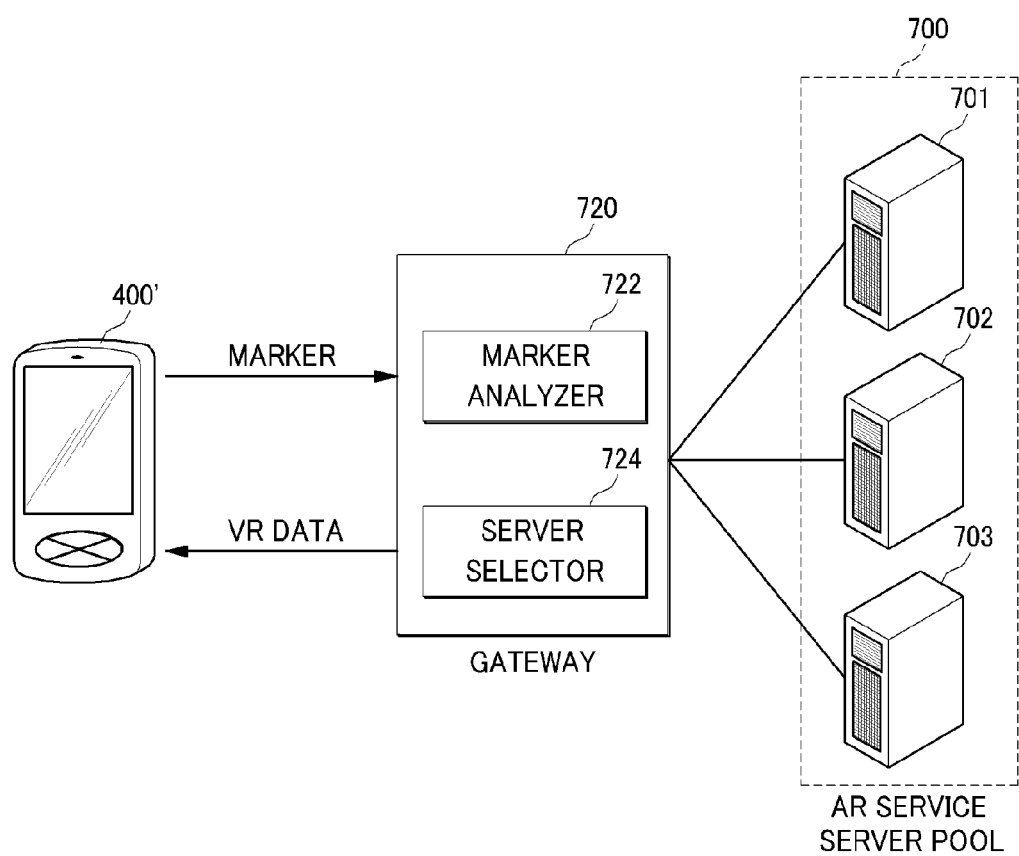
FIG. 7 is a schematic diagram of another illustrative embodiment of a method for providing an AR service.
Figure 2:
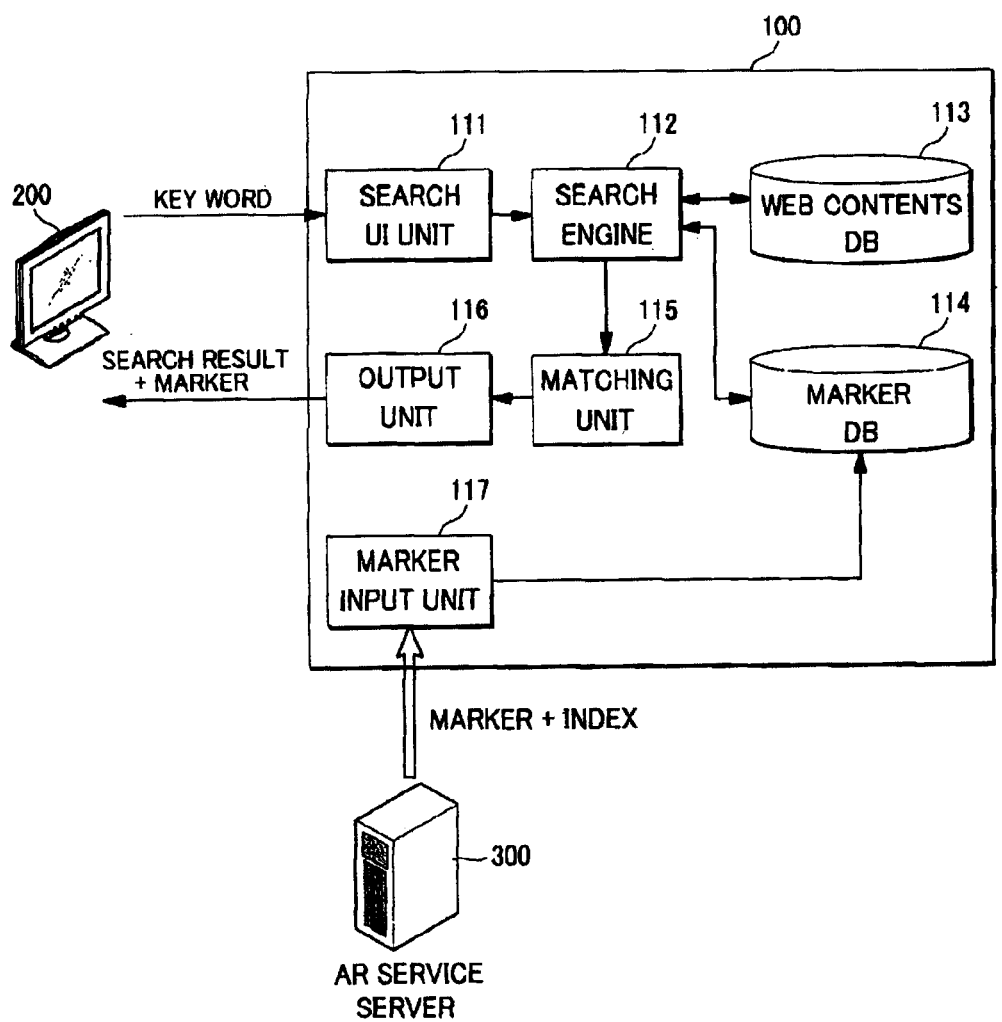
Figure 4:
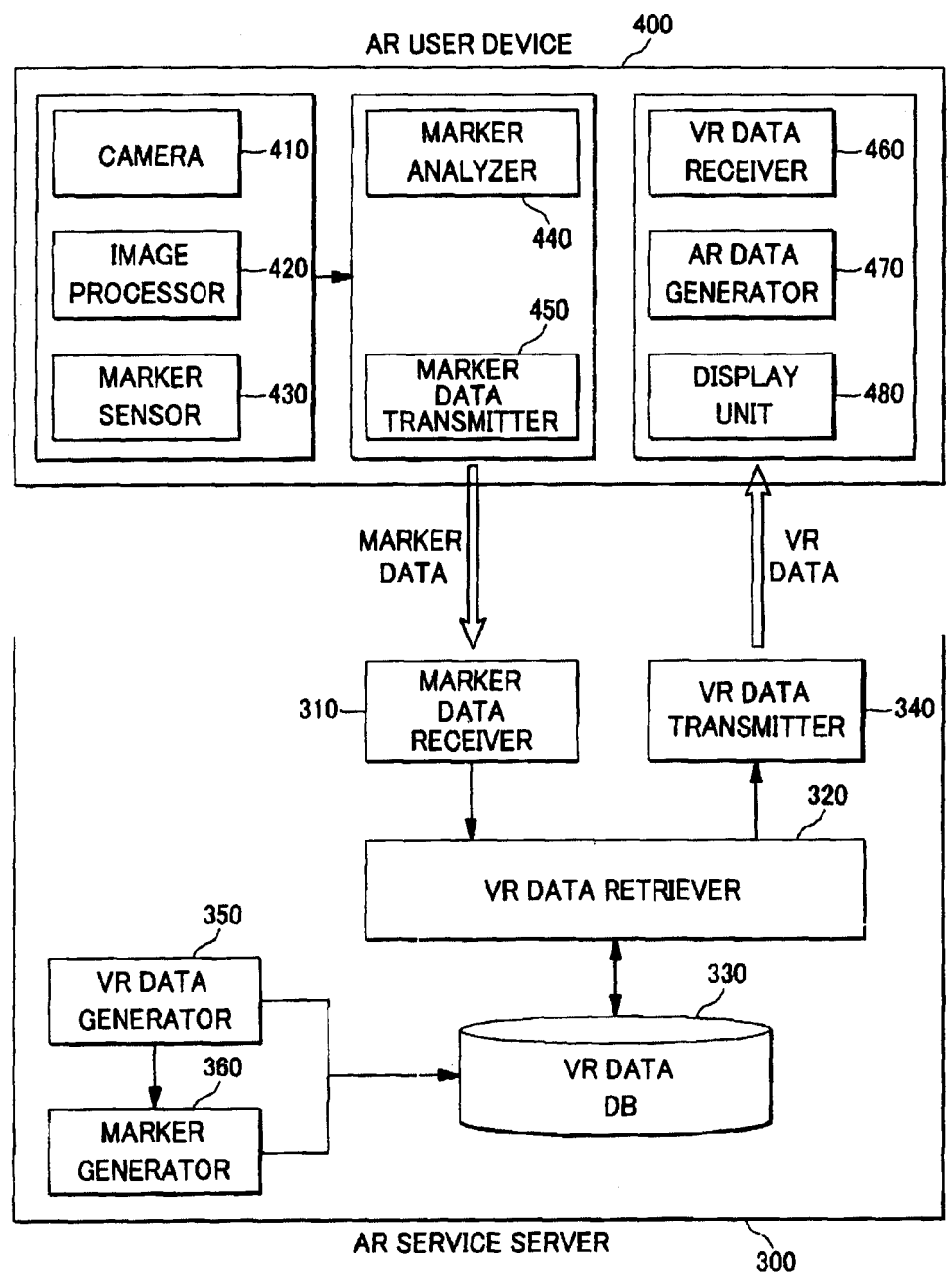

FIG. 7 is a schematic diagram of another illustrative embodiment of a method for providing an AR service. FIG. 7 illustrates an AR service server pool 700 including a multiple number of AR service servers 701, 702, and 703 and a gateway 720. Gateway 720 interconnects AR user device 400 with AR service server pool 700. AR service servers 701, 702, and 703 are configured to operate in the same manner as AR service server 300.

The AR service illustrated in FIG. 7 is different from the above-described AR service in that AR user device 400' does not analyze a marker but transmits the marker to predetermined gateway 720. Gateway 720 includes a marker analyzer 722 and a server selector 724. Marker analyzer 722 extracts metadata from the marker as depicted in FIG. 6 by analyzing the marker. More specifically, marker analyzer 722 may extract an address of any one of AR service servers 701, 702, and 703 from a server address field (for example, 201A in FIG. 6) and transmit the extracted address to server selector 724.

Server selector 724 can select any one of AR service server 701, 702, and 703 based on the extracted address and transmit the marker to the selected AR service server. Thus, gateway 720 may transmit the marker to the selected AR service server and receive VR data corresponding to the transmitted marker from the selected AR service server. The VR data corresponding to the marker transmitted via gateway 720 is transmitted to AR user device 400' via gateway 720 again.

As compared to embodiment shown in FIG. 4, marker analyzer 440 may be optionally omitted in AR user device 400'. That is, AR user device 400' transmits the marker to gateway 720 having a predetermined address. Therefore, in accordance with the embodiment illustrated in FIG. 7, since marker analyzer 440 illustrated in FIG. 4 may be optionally omitted, a configuration of AR user device 400' can be simple.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a second third, middle third and first third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system for identifying markers and generating augmented reality, comprising:

a marker input unit configured to receive one or more markers and one or more indexes of each of the markers, each of the indexes including one or more terms that describe virtual reality data;

a search engine including at least one processor configured to identify web content that corresponds to a keyword and to identify the markers that correspond to the keyword based on a similarity between the keyword and the one or more indexes of the markers;

a matching unit configured to correlate the identified web content with one or more of the identified markers and to generate a document that comprises the web content and the one or more of the correlated, identified markers;

an output unit configured to transmit the document that comprises the web content and the one or more correlated, identified markers, wherein each of the one or more correlated, identified markers comprises a two-dimensional image that identifies corresponding virtual reality data, wherein the corresponding virtual reality data comprises at least one of an image, a video, and a 3D object;

a virtual reality data receiver configured to receive the corresponding virtual reality data based on the one or more correlated, identified markers; and an augmented reality generator configured to generate augmented reality data by overlaying the received virtual reality data on a real world image.

2. The system of claim 1, further comprising:

a web contents database configured to store a plurality of web contents; and a marker database configured to store a plurality of markers, wherein the search engine is further configured to access the web contents database and the marker database to search for the web content and the one or more of the markers.

3. The system of claim 1, wherein the marker input unit includes a user interface configured to receive the one or more markers and one or more indexes of each of the markers from an external device.

4. The system of claim 1, wherein each of the one or more indexes of each of the markers includes superordinate terms or subordinate terms that describe the virtual reality data.

5. The system of claim 1, wherein the document is a web page that contains the web content and the correlated markers.

6. The system of claim 1, wherein:

the one or more markers and the one or more indexes are transmitted in binary code; and the matching unit is configured to correlate the web content with the one or more of the markers based on a correlation value for the keyword, wherein the correlation value is calculated by correlating binary codes of the keyword with binary code of the one or more indexes of each of the markers or the binary codes of text in the web content.

7. The system of claim 1, wherein the document comprises a list of hyperlinks referring to the web content and the correlated markers.

8. The system of claim 1, wherein the marker input unit continuously receives and stores markers through at least one network.

9. The system of claim 1, wherein each of the one or more markers comprises a random pattern.

10. The system of claim 1, wherein the search engine is further configured to search a plurality of indexes for the at least one marker related to the keyword.

11. A method for identifying markers and generating augmented reality, comprising:
- receiving one or more markers and one or more indexes of each of the markers, each of the indexes including one or more terms that describe virtual reality data;
- identifying web content that corresponds to a keyword and the markers that correspond to the keyword based on a similarity between the keyword and the one or more indexes of the markers;
- correlating the identified web content with one or more of the identified markers;
- generating a document that comprises the web content and the one or more of the correlated, identified markers;
- transmitting the document that comprises the web content and the one or more correlated, identified markers, wherein each of the one or more correlated, identified markers comprises a two-dimensional image that identifies corresponding virtual reality data, wherein the corresponding virtual reality data comprises at least one of an image, a video, and a 3D object;
- receiving the corresponding virtual reality data based on the one or more correlated, identified markers; and
- generating augmented reality data by overlaying the received virtual reality data on a real world image.

12. The method of claim 11, further comprising receiving a search request including the keyword through a network.

13. The method of claim 12, further comprising providing at least one of the web content and an address for the web content to the search engine in response to the search request.

14. The method of claim 11, wherein correlating the identified web content with one or more of the identified markers comprises matching the identified web content with the one or more of the identified markers using a correlation value calculated based on a correlation between binary codes of the keyword and at least one of binary codes of the index and binary codes of texts in the web content.

15. A non-transitory computer-readable storage medium storing instructions thereon that, when executed by a processor, cause the processor to perform steps for identifying markers and generating augmented reality comprising:
- receiving one or more markers and one or more indexes of each of the markers, each of the indexes including one or more terms that describe virtual reality data;
- identifying web content that corresponds to a keyword and the markers that correspond to the keyword based on a similarity between the keyword and the one or more indexes of the markers;
- correlating the identified web content with one or more of the identified markers;
- generating a document that comprises the web content and the one or more of the correlated, identified markers;
- transmitting the document that comprises the web content and the one or more correlated, identified markers, wherein each of the one or more correlated, identified markers comprises a two-dimensional image that identifies corresponding virtual reality data, wherein the corresponding virtual reality data comprises at least one of an image, a video, and a 3D object;
- receiving the corresponding virtual reality data based on the one or more correlated, identified markers; and
- generating augmented reality data by overlaying the received virtual reality data on a real world image.

16. The non-transitory computer-readable storage medium of claim 15, wherein the one or more indexes of each of the markers includes one or more terms describing virtual reality data of the marker.

* * * * *

UNITED STATES PATENT AND TRADEMARK OFFICE
CERTIFICATE OF CORRECTION

Page 1 of 3

PATENT NO.       : 8,682,879 B2
APPLICATION NO.  : 12/762224
DATED            : March 25, 2014
INVENTOR(S)      : Kim et al.

It is certified that error appears in the above-identified patent and that said Letters Patent is hereby corrected as shown below:

On Title Page 2, in item (56), under "OTHER PUBLICATIONS", in Column 1, Line 3, delete "Availablet" and insert -- Available --, therefor.

In the Drawings

Delete drawing sheet 3 of 8, and substitute the attached drawing sheet 3.

Delete drawing sheet 5 of 8, and substitute the attached drawing sheet 5.

In the Specification

In Column 4, Line 6, delete ""Beckam,"" and insert -- "Beckham," --, therefor.

In Column 6, Line 28, delete "fly," and insert -- flv, --, therefor.

In Column 8, Lines 1-2, delete "AR service server 400" and insert -- AR service server 300 --, therefor.

In Column 9, Line 61, delete "search system 300" and insert -- search system 100 --, therefor.

In Column 11, Line 49, delete "and or" and insert -- and/or --, therefor.

Signed and Sealed this
Fifteenth Day of July, 2014

Michelle K. Lee
*Deputy Director of the United States Patent and Trademark Office*